Patented Feb. 9, 1932

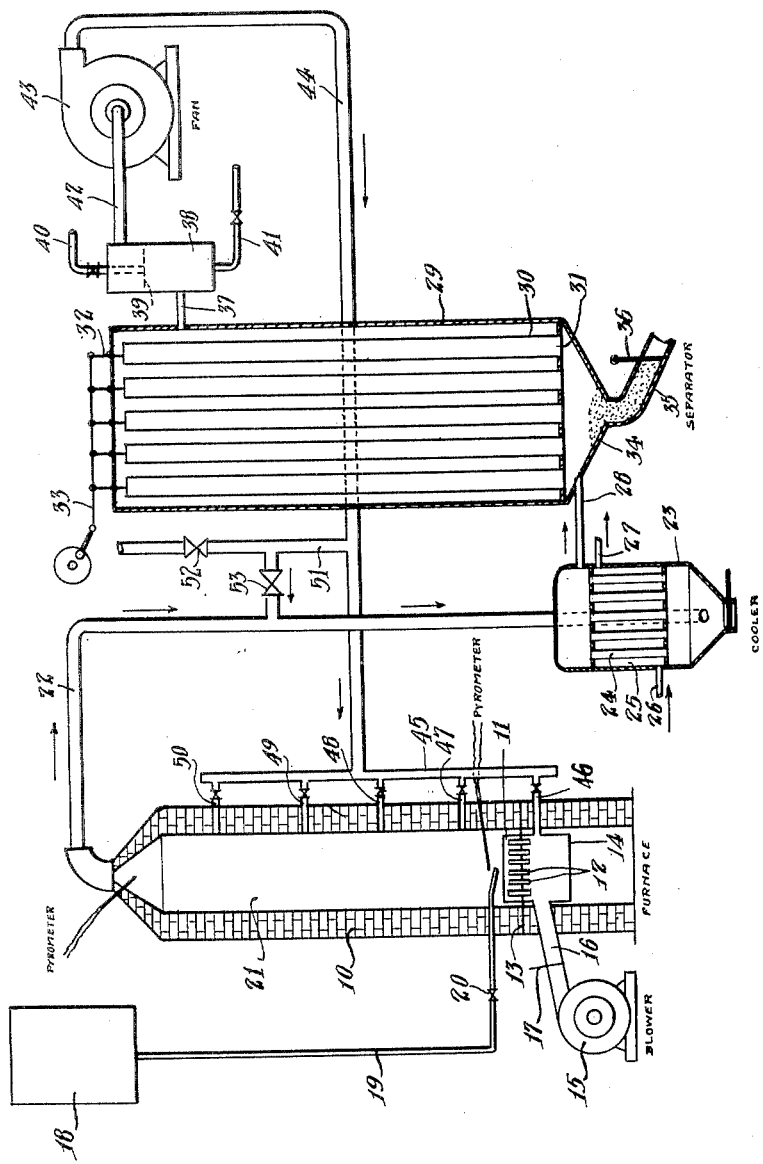

1,844,327

UNITED STATES PATENT OFFICE

ERNEST E. LYDER, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

PROCESS AND APPARATUS FOR MANUFACTURING LAMP BLACK

Application filed October 27, 1928. Serial No. 315,434.

This invention relates to a method of manufacturing finely divided carbon such as is commonly called "lamp black" or "carbon black" from hydrocarbon fuel, and particularly from oil such as petroleum. More particularly, this invention relates to a process and to an apparatus adapted to be used in carrying out the process whereby carbon black of uniform grade may be manufactured from a hydrocarbon oil and a high yield maintained.

In the manufacture of lamp black from oils, a body of oil is maintained under such conditions as to cause incomplete combustion and the products of such combustion are then separated so as to remove the finely divided solid carbon particles from the combustion gases. The temperature of combustion is an important factor upon which the quality of the resulting product depends.

For example, when the combustion temperture is in a low range, the resulting lamp black will generally have a high tinting power but a decided red undertone, while a lamp black made from a hydrocarbon oil consumed at a relatively high temperature will have a relatively low tinting strength, but a quite desirable blue undertone. Both of these grades of carbon, as well as other grades, are desired for various industrial purposes, but it is essential that the temperature of combustion be maintained uniform within a proper range so that the resulting product is of uniform quality and substantially free from moisture and soluble material.

When high combustion temperatures are used, a certain proportion of combustion of the oil not only takes place in a combustion bed, but also is continued in the combustion chamber proper, thereby reducing the yield due to the combustion of the finely divided carbon. As has been stated before, the use of high combustion temperatures produces a very desirable carbon with a blue undertone, and one of the objects of this invention is to enable such carbon to be made without reducing the normal yield.

An object of this invention is to provide a process of manufacturing lamp or carbon black from hydrocarbon fuels in a simple, efficient and continuous manner.

Another object is to disclose a method of increasing the yield of carbon black in a process of manufacturing said black from hydrocarbon oils.

Another object is to provide a method of controlling and regulating combustion temperatures during the maufacture of finely divided carbon from gaseous or liquid hydrocarbon fuels.

Another object is to provide means for controlling and regulating temperatures during the separation of finely divided carbon from combustion gases.

An object of this invention is to disclose and provide means whereby finely divided carbon of uniform quality may be produced from hydrocarbon oils.

A still further object of this invention is to provide means for controlling combustion temperatures, calcining temperatures and temperatures existing during separation of finely divided carbon from combustion gases in a process of making carbon black.

Other objects, uses and advantages will be apparent to those skilled in the art from the following detailed description of one form of apparatus and of a process which may be carried out in such apparatus. Reference will be made to the attached drawing which diagrammatically illustrates an apparatus suitable for use with the hereinafter described process.

As has been stated hereinabove, a carbon black with a blue undertone has a low tinting strength, while a carbon with a red undertone has a high tinting strength. Both of these grades of carbon can be, and very often are, produced almost simultaneously in customary forms of apparatus, and for this reason, the final product is of poor quality, having neither the characteristics of one grade nor of another. The character of the product, however, may be controlled by regulating the combustion temperatures and also by regulating the calcining temperatures. Furthermore, the temperatures present during separation of the carbon from the products of combustion influence the quality of the product. Therefore, the control of the quality of carbon which it is desired to produce is influenced by combustion temperatures, calcining temperatures, time of calcination and separation temperatures. The process and apparatus hereinafter described permits accurate control of temperatures at every stage of the process.

Generally described, the process comprises regulating temperatures in the combustion bed, in the combustion chamber and in the separating and cooling steps by the use of an inert or oxygen-lean gas. Preferably, the gases deficient in oxygen used in controlling the temperatures and quality of the product may be obtained from the combustion gases themselves by proper methods of recirculation and introduction.

Referring to the attached drawing, the apparatus in which the process may be carried out may consist of a furnace preferably of cylindrical form such as the furnace 10.

The combustion bed or zone may comprise a burner pan 11 provided with means for supplying air to the surface of a body of oil in the pan 11. Air may be supplied to the surface of the body of oil by means of pipes 12 extending through the bottom 13 of the pan and scattered over the bottom of the pan. Air may be supplied to the housing 14 beneath the pan 11 (the lower end of pipes 12 extending into the chamber formed by the housing 14) from a suitable blower 15 adapted to discharge air into the housing 14 through a line 16 provided with suitable regulating or damping means 17. When gaseous hydrocarbon fuel is used instead of oil, the combustion zone will consist of suitable burners instead of the pan hereinabove described.

Any suitable hydrocarbon fuel, for example, a petroleum oil, may be supplied to the pan 11 from any suitable source such as a feed tank 18 through a line 19 terminating in the pan 11 and provided with a valve 20.

The upper portion of the furnace 10 may comprise a combustion chamber 21 from which the products of combustion may be discharged through a suitable pipe or line 22 into a cooler 23. The construction of the cooler 23 may vary materially, but as shown in the drawing, it may consist of a housing provided with a bank of tubes 24 passing through a chamber 25 through which cold air, gas or water is circulated by means of the inlet and outlet means 26 and 27. Preferably, the outlet of pipe 22 terminates in the lower portion of the cooler 23, thereby causing the products of combustion from the combustion chamber 21 to travel upwardly through the pipes 24 and be discharged through a line 28 from the upper portion of the cooler 23.

The products of combustion are not only cooled in the apparatus shown at 23 but in addition, coarse particles, agglomerates and tarry products are thrown out and separated from the combustion gases, so that only the finely divided carbon together with the combustion gases, is discharged through line 28.

The cooled and somewhat purified products of combustion may then be separated in any desired type of apparatus. As shown in the drawing, the separation may take place in an enclosed bag chamber consisting of the enclosure or housing 29 in which a plurality of bags or stockings 30 are suspended. As shown in the drawing, the bags 30 are attached at their lower ends to a perforated plate or floor 31, the upper ends of the bags 30 being closed and attached by means of levers 32 pivotally connected to the housing 29 with a reciprocating or movable shaker bar 33. The lower portion of the separator 29 may be provided with a conical bottom 34 adapted to receive the finely divided carbon from which such carbon may be taken to storage or suitable packing machine through a chute 35 provided with a valve or other closure 36.

The combustion gases may be separated from the finely divided carbon in the apparatus hereinabove described and discharged therefrom through an outlet 37 into a cooler and condenser 38 which may be provided with a spray or jet of water 39 supplied to the condenser and cooler 38. The condenser or cooler 38 may also be provided with a valved drain or outlet 41.

The cooled combustion gases may then be discharged from the cooler 38 through an outlet or discharge pipe 42 leading to the inlet of a circulating fan 43. The combustion gases may be discharged from the fan 43 through a line 44 leading to a vertical manifold 45 adjoining the furnace 10. The manifold 45 may be provided with a plurality of valved discharge leads 46, 47, 48, 49 and 50, leading into the furnace at various vertical points. Preferably one or more of the leads enter the furnace 10 below the burner pan 11 and as shown in the drawing, the lead 46 discharges into the compartment or housing 14 beneath the burner pan 11, while leads 47 to 50 inclusive discharge into the upper portion of the furnace 10 at predetermined intervals.

Line 44 containing cooled combustion gases discharged by the circulating fan 43 may be provided with a line 51 discharging into the atmosphere or to any other suitable place of disposal through a valve 52. The line 51 may be connected to the line 22 by means of a valved pipe 53, thereby permitting the discharge of combustion gases from line 44 into line 22.

In carrying out my improved process of the apparatus hereinabove described, a body or area of oil undergoing incomplete combustion is maintained in the burner pan 11, only sufficient quantities of air being supplied to the surface of such body or area of oil by the plurality of pipes 12 as is necessary or desirable to maintain such oil at the proper combustion temperatures.

Oil may be continuously fed to the pan 11 from the feed tank 18 through the line 19 by regulation of the valve 20. It will be understood that if it is desirable to maintain the combustion bed in pan 11 at a high temperature, say a temperature of about 2000° F., rather large quantities of air will be supplied to the combustion bed by the fan or blower 15. When such high combustion temperatures are used, there is a tendency for the products of combustion to continue burning above the combustion bed in pan 11 and more particularly in the chamber 21. During such burning as takes place in chamber 21, material quantities of carbon formed in the combustion bed are consumed in the chamber 21, thereby reducing the yield of carbon. It is desirable, under certain conditions, to maintain the products of combustion at a high temperature for some time and therefore, it is not desirable to unduly cool the products of combustion in chamber 21.

In order to maintain high temperatures in chamber 21 without undue consumption of finely divided carbon therein, an inert or oxygen-lean gas may be admitted to combustion chamber 21 from line 44 through the feed lines 47, 48, 49 and 50. When very high temperatures are being maintained in chamber 21, it may be necessary to use all of the leads 47 to 50, while under other conditions, the admission of an inert gas through leads 47 and 48 may be sufficient.

The products of combustion discharged from chamber 21 through line 22 are then robbed of their excess heat in the cooler 23 wherein such combustion products are also denuded of tarry matter and large, solid particles which drop to the bottom of the cooler 25 and may be periodically removed therefrom. The somewhat cooler and tar-free products of combustion are then discharged from line 28 into the separating means 29 which, as has been stated before, may comprise a plurality of porous bags or stockings 30, which allow the combustion gases to pass through while retaining the finely divided carbon. The carbon may be periodically or continuously removed from the inner surfaces of the bags 30 by shaking the bags by means of the arm 33 and links 32.

In order to substantially completely remove all soluble matter from the carbon or in order to produce a carbon black substantially free from soluble matter, it is apparently necessary to maintain the carbon at a high temperature for some time after it is formed. In order to reduce the quantity of soluble material, as well as to eliminate the moisture, it is desirable, therefore, to run the separating chamber at a high temperature and to add a large excess of diluent gas. Heretofore, it has not been possible to operate separating chambers at high temperatures in view of the fact that there was a tendency for the bags to ignite. The admission of air dilution of the products of combustion with air permitted the operation of the bags and separating chambers at low temperature, but higher temperatures were again obviated by reason of danger from fire.

In accordance with my invention, however, an inert gas or a gas deficient in oxygen may be added to the combustion products either as shown at 53, or such addition of oxygen-lean gases may be made to the products of combustion at line 28. This permits the addition of large quantities of gas adapted to thoroughly dry the carbon and remove moisture therefrom without materially reducing the temperature and without the danger of fire.

The source of oxygen-lean or inert gases may be the process itself. For example, the combustion gases separated from the finely divided carbon in the separating chamber 29 and discharged therefrom through the line 37 may be cooled to any desired temperature in the cooler and condenser 38 and then recirculated by means of the fan 43 and line 44, back into the combustion chamber 21 through leads 47 to 50 inclusive, or into the line 22 through pipes 51 and 53. As has been stated before, the combustion gases from line 44 may also be supplied and added to the products of combustion by supplying such combustion gases from line 44 to line 28. Excess combustion gases supplied by fan 43 may be eliminated from the system through the valved outlet 52.

When it is desired to operate the combustion chamber 21 at a low temperature and the combustion bed in the pan 11 at a low temperature (say about 1000° F.), then inert gases or gases deficient in oxygen may be supplied to the surface of the body of oil in the pan 11 through pipes 12.

This can be most readily accomplished by admitting cooled combustion gases from line 44, manifold 45 and lead 46, into the housing or chamber 14 beneath the pan 11. The introduction of oxygen-lean gases into the chamber 14 dilutes the air being supplied to the burner pan 11 by fan 15, thereby reducing the temperature of combustion in the combustion bed. Regulation of the valve lead 46 and the damper 17 in line 16 permits very close control of the combustion temperatures.

From the above description it is seen that my process comprises a method of making carbon black or lamp black by incomplete combustion of hydrocarbon fuels in which the fixed or inert gaseous products of combustion, after being freed from the carbon black, are used to control the temperature in the combustion bed or zone to control the temperature in the combustion chamber, the temperature of calcination after the black is formed, to control the time of calcining the black at a given temperature, to arrest the combustion of the carbon after it is formed and thereby increase the yield, to control the temperature at which the carbon black is separated from the gaseous products, to remove the moisture from the product and to control the cooling of the apparatus through the important stages of the process.

Although the process has been described as carried out in a particular type of apparatus, it is to be understood that I am not limited thereby to such apparatus nor to the operation of the process as described or of the apparatus as described, but numerous modifications and changes may be made and the process carried out in various types and arrangements of equipments without departing from the spirit of the invention, the invention including all such modifications and changes as come within the scope of the following claims.

I claim:

1. In a method of manufacturing finely divided carbon from hydrocarbon fuels the steps of, supplying a liquid hydrocarbon fuel to a combustion zone, admitting air in regulated quantities to said zone but in insufficient quantity to cause complete combustion, and cooling and regulating the temperature of combustion by separately introducing gases deficient in oxygen directly to said zone.

2. In a method of manufacturing finely divided carbon from hydrocarbon fuels the steps of, maintaining a combustion zone of liquid fuel undergoing incomplete combustion in a combustion chamber, admitting air in regulated quantities to said zone, and cooling and regulating the temperature of the combustion chamber above said zone by separately introducing gases deficient in oxygen directly into said chamber.

3. In a method of manufacturing finely divided carbon from hydrocarbon fuels the steps of, maintaining a combustion zone of oil undergoing incomplete combustion in a combustion chamber, regulating the cooling of said products of combustion from said chamber by the introduction of gases deficient in oxygen into said products of combustion discharged from said combustion chamber, and then separating finely divided carbon from said products of combustion.

4. A method of manufacturing finely divided carbon from petroleum oils comprising, maintaining a combustion bed of oil undergoing incomplete combustion in a combustion chamber, regulating the temperature of combustion by introducing gases deficient in oxygen to said bed, cooling the products of combustion from said bed, regulating the cooling of said products of combustion by the introduction of gases deficient in oxygen thereinto after their discharge from said combustion chamber and then separating finely divided carbon and combustion gases from said cooled products of combustion.

5. A method of manufacturing finely divided carbon from petroleum oils comprising, supplying a hydrocarbon oil to a combustion bed in a combustion chamber, admitting air in regulated quantity at a plurality of points on the surface of said bed in quantities insufficient to cause complete combustion, and cooling and regulating the temperature in said chamber above said bed by introducing gases deficient in oxygen into said chamber.

6. A method of manufacturing finely divided carbon from petroleum oils comprising, supplying a hydrocarbon oil to a combustion zone in a combustion chamber, separately and directly admitting air in regulated quantity at a plurality of points on the surface of said zone and in quantities insufficient to cause complete combustion, discharging products of combustion from said chamber into a separating chamber, separately discharging combustion gases and finely divided carbon from the separating chamber and regulating the temperature of said separating chamber by introducing predetermined quantities of gases deficient in oxygen into said products of combustion and prior to their entry into said separating chamber.

7. A method of manufacturing finely divided carbon from petroleum oils comprising, maintaining an area of oil undergoing incomplete combustion in a combustion zone in a combustion chamber, regulating the temperature of said combustion chamber by introducing gases deficient in oxygen thereto, separating tarry and coarse, solid particles from the products of combustion, then discharging the substantially tar-free products of combustion into a separating chamber, separately discharging combustion gases and finely divided carbon from said chamber and regulating the temperature of said separating chamber by introducing predetermined quantities of gases deficient in oxygen into said tar-free products of combustion.

8. In a method of manufacturing finely divided carbon from liquid hydrocarbon fuels, the steps of supplying a liquid hydrocarbon fuel to a combustion chamber, admitting air in regulated quantities to said chamber but in insufficient quantity to cause complete combustion, and cooling and regulating the temperature of the combustion chamber by separately introducing gases deficient in oxygen directly into said chamber.

9. An apparatus for manufacturing finely divided carbon from combustible oils comprising, a combustion chamber, a combustion zone within said chamber, means for supplying a combustible oil to said zone, separate means for introducing air to the zone, means for separating solid particles from the combustion gases, means for discharging combustion gases from said combustion chamber into said separating means, and means for introducing oxygen-lean gases into the last-named means.

10. An apparatus for the manufacture of finely divided carbon from petroleum oil comprising, a combustion chamber, a burner pan in said chamber, means for supplying an oil to said pan, separate means for introducing air to the surface of the pan, means for introducing inert gas to the surface of said pan, means for introducing inert gas into the combustion chamber above said pan, means for separating solid particles from the combustion gases, and means for discharging combustion gases from said combustion chamber to said separating means.

Signed at Richmond, California, this 9th day of October, 1928.

ERNEST E. LYDER.